Dec. 14, 1926. 1,611,069
A. L. PUTNAM
QUICK ATTACHMENT MEANS FOR DEMOUNTABLE DISK WHEELS
Filed May 28, 1923   2 Sheets-Sheet 1
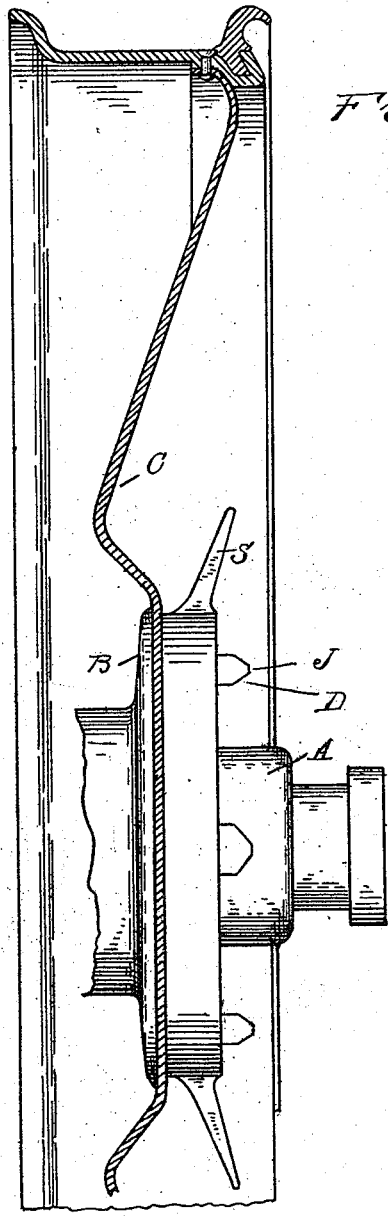
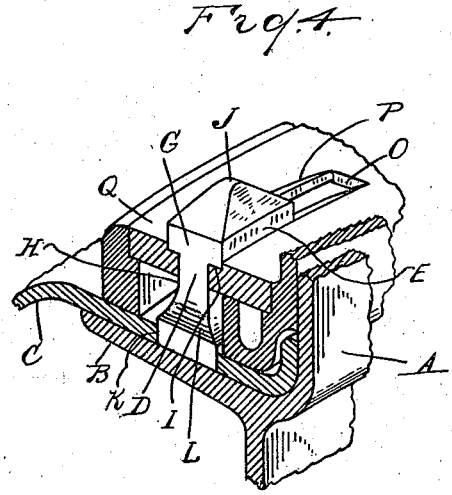
Inventor
Alden L. Putnam
Attorneys Dec. 14, 1926.
A. L. PUTNAM
1,611,069
QUICK ATTACHMENT MEANS FOR DEMOUNTABLE DISK WHEELS
Filed May 28, 1923  2 Sheets-Sheet 2
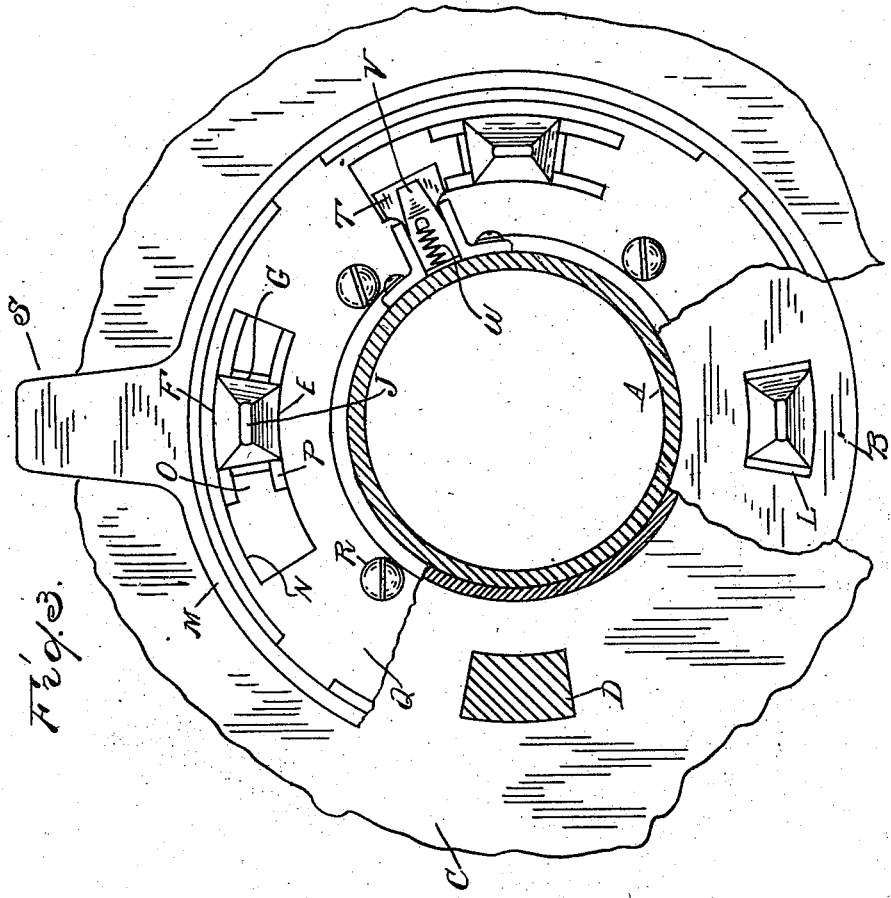
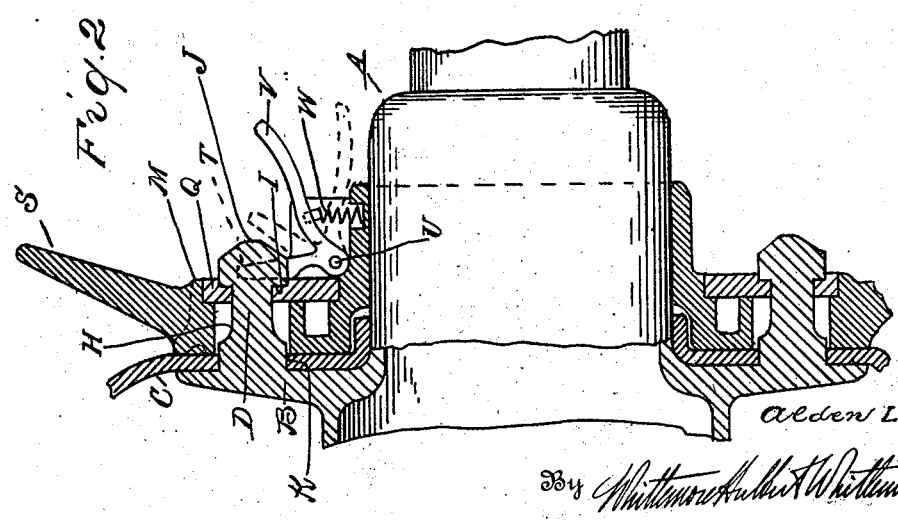
Inventor
Alden L. Putnam Patented Dec. 14, 1926.

1,611,069

UNITED STATES PATENT OFFICE.

ALDEN L. PUTNAM, OF DETROIT, MICHIGAN, ASSIGNOR, BY DIRECT AND MESNE ASSIGNMENTS, OF ONE-HALF TO MOTOR WHEEL CORPORATION, OF LANSING, MICHIGAN, A CORPORATION OF MICHIGAN, AND ONE-HALF TO THE MIDLAND STEEL PRODUCTS COMPANY, OF CLEVELAND, OHIO, A CORPORATION OF OHIO.

QUICK-ATTACHMENT MEANS FOR DEMOUNTABLE DISK WHEELS.

Application filed May 28, 1923. Serial No. 642,045.

The invention relates to attachment means for demountable disk wheels, being more particularly designed for use on racing cars, with the object of minimizing the time required for exchange of wheels. To this end the invention consists in the construction as hereinafter set forth.

In the drawings:

Figure 1 is a cross-section through a demountable disk wheel to which my improvements are applied;

Figure 2 is an enlarged section of the attachment means;

Figure 3 is a sectional front elevation thereof; Figure 4 is a sectional perspective view of a portion of Figure 3.

A is the wheel hub of any suitable construction, provided with a radially outwardly extending flange B to which the disk C is to be attached. The flange B is provided with a series of laterally extending studs D, these being preferably formed of segments of an annular flange, the remainder of which is cut away. Thus the studs D have inner and outer surfaces E and F that are concentric with the axis of the hub and radially extending side surfaces G. The surfaces F and G are also undercut, as indicated at H, to form shoulders I facing the flange of the hub, which shoulders are preferably tapered or inclined. The studs are further provided with tapering end portions J, which facilitate engagement with the disk.

The disk C has cut therein the segmental recesses K which exactly register with the studs D. To facilitate entry of the studs into these recesses, the portion of the stud adjacent to the flange B, and which extends through the thickness of the disk, is of greater width than the outer portion and is connected therewith by the tapering portion L. Thus the disk, when mounted on the hub, will be exactly positioned by said studs, being held both concentric with the axis of the wheel and from rotary movement.

M is a clamping ring having a portion fitting upon the barrel of the hub A and a face for contacting with the disk. This ring is also provided with segmental apertures N of sufficient size and so located as to permit of the passage of the studs D therethrough. Extending from one side of these apertures N are the segmental slots O of lesser width and which leave portions P for engaging the recesses H in the studs and fitting against the shoulders I. Preferably, the ring M is formed in two parts, the outer plate Q being stamped to form the recesses N and slots O, said plate being secured by suitable means such as the screws R to the body of the ring. The portions P of this plate are also slightly tapered or cammed, so that when moved into engagement with the shoulders H, which are similarly tapered or inclined, all lost motion will be taken up and the ring will be tightly clamped against the disk. S are lugs or handles projecting radially outward from the ring M and forming means for tightening or loosening the same.

With the construction as thus far described, to mount the wheel, it is only necessary, first, to place the disk on the hub and engage the apertures K thereof with the studs D, second, to place the ring M upon the hub, passing the studs D through the apertures N, and, finally, to give the ring a slight rotation by means of the handles S, which will cause the tapering or cammed portions P to engage with the shoulders I and clamp the ring and disk to the flange B.

To hold the ring from accidental disengagement, a suitable locking latch is provided, such, for instance, as indicated at T. This latch is in the form of a radially extending arm pivoted at U and adapted to be swung from a position shown in dotted lines in Figure 2, where it will clear the ends of the studs D, to a position shown in full lines in such figure, where it will extend adjacent to one of the studs. A handle V is provided for rocking the arm T and a spring W actuates said handle to normally hold the arm T in a position for interfering with the stud. Thus, in clamping the disk the handle V is operated to retract the arm T so as to permit the turning of the ring M and, after clamping, the release of said handle will throw the arm T into a position where it will interfere with the reverse turning of the ring by striking against the stud D. Centrifugal force will, when the wheel is rotating, hold the latch in engaged position so that no reliance need be placed upon the spring W. It will be noted that when the wheel is mounted the studs D project through the apertures N and the latch T is displaced, thereby being rocked upon its fulcrum U. After the ring is rotated to clamped position, the latch will spring back into the path of the stud so as to prevent accidental reverse rotation.

It will be understood that with a device as described, both the mounting and the demounting of the wheel may be accomplished in a very brief interval and that the wheel, when mounted, is securely held from accidental disengagement.

What I claim as my invention is:

1. In a mounting device for disk wheels, the combination with a hub having a radially extending flange, of a series of segmental studs extending laterally from said flange undercut to form shoulders facing said flange, a disk for mounting on said hub apertured to register with said studs, a ring for clamping said disk also apertured in registration with said studs and provided with slots extending from said apertures concentric with the axis of the hub and engageable with said undercut portions of the studs by a rotary movement.

2. In a mounting device for disk wheels, the combination with a hub having a radially outwardly extending flange, of a series of segmental studs extending laterally from said flange having inner and outer faces substantially concentric with the axis of the wheel and undercut to form shoulders facing said flange, a disk on said hub having segmental apertures therein registering with said studs to permit the passage of the same therethrough, a ring for clamping said disk provided with corresponding segmental registering apertures and also with segmental slots of lesser width extending from said aperture concentric with the axis of the wheel engageable with said undercut portions and the shoulders thereof.

3. In a mounting device for disk wheels, the combination with a hub having a radially extending flange, of a series of studs extending laterally from said flange having inner and outer faces substantially concentric with the axis of the wheel, being undercut to form shoulders facing said flange and extending radially at opposite ends of the segments, a disk for mounting on said hub having segmental apertures therein registering with and fitting the inner portions of said studs, a ring for clamping said disk provided with corresponding segmental registering apertures and also provided with segmental slots of lesser width extending from said apertures concentric with the axis of the wheel with portions on opposite sides of said slots for engaging said shoulders, and handle means on said ring for rotating the same to engage or disengage said shoulders.

4. In a mounting device for disk wheels, the combination with a hub having a radially extending flange, of a series of segmental studs extending laterally from said flange having inner and outer faces substantially concentric with the axis of the wheel, undercut to form shoulders facing said flange with radially extending faces at opposite ends of the concentric faces, said studs being reduced in width at their outer ends, a disk for mounting on said hub having segmental apertures therein registering with said studs to permit the passage of the same therethrough, a ring for clamping said disk provided with corresponding segmental registering apertures and also provided with segmental slots of lesser width extending from said apertures concentric with the axis of the wheel, said slots having portions on opposite sides thereof, of a tapering section for engaging said shoulders on the studs by a rotative movement to wedge said ring against said disk and flange.

5. In a mounting device for disk wheels, the combination with a hub having a radially extending flange, of a stud extending laterally from said flange undercut to form a shoulder facing said flange, a disk for mounting on said hub apertured to register with said stud, a ring for clamping said disk also apertured in registration with said stud and provided with a slot extending from said aperture concentric with the axis of the hub and engageable with said undercut portion of the stud by a rotary movement, and a locking latch secured to said ring located opposite said aperture to be displaced by the stud when inserted therethrough and automatically thrown in the path of said stud when said ring is rotated to prevent accidental reverse rotation.

6. In a mounting device for disk wheels, the combination with a hub having a radially extending flange, of a stud extending laterally from said flange undercut to form a shoulder facing said flange, a disk for mounting on said hub apertured to register with said stud, a ring for clamping said disk also apertured in registration with said stud and provided with a slot extending from said aperture concentric with the axis of the hub and engageable with said undercut portion of the stud by a rotary movement, a locking latch secured to said ring located opposite said aperture to be displaced by the stud when inserted therethrough and automatically interlocking with said stud when said ring is rotated to prevent accidental reverse rotation, and concentrically operated means for holding said latch from disengagement with said stud during the rotation of the wheel.

In testimony whereof I affix my signature.

ALDEN L. PUTNAM.